Oct. 27, 1970 H. HAAG ET AL 3,537,061

TELEPHONE JACK CONNECTOR

Filed Nov. 12, 1968 3 Sheets-Sheet 1

INVENTORS.
HERBERT HAAG
HARALD JURSCHIK
BY [signature]
ATTORNEY.

TELEPHONE JACK CONNECTOR

Filed Nov. 12, 1968 3 Sheets-Sheet 2

INVENTORS.
HERBERT HAAG
HARALD JURSCHIK
BY [signature]
ATTORNEY.

Oct. 27, 1970 H. HAAG ET AL 3,537,061

TELEPHONE JACK CONNECTOR

Filed Nov. 12, 1968 3 Sheets-Sheet 3

INVENTORS.
HERBERT HAAG
HARALD JURSCHIK
BY [signature]
ATTORNEY.

United States Patent Office
3,537,061
Patented Oct. 27, 1970

3,537,061
TELEPHONE JACK CONNECTOR

Herbert Haag, Ilsfeld, and Harald Jurschik, Heilbronn, Germany, assignors to International Standard Electric Corporation, New York, N.Y., a corporation of Delaware Filed Nov. 12, 1968, Ser. No. 774,836
Claims priority, application Germany, Nov. 25, 1967, 1,537,598
Int. Cl. H01r 17/18, 29/00
U.S. Cl. 339—31 4 Claims

ABSTRACT OF THE DISCLOSURE

A telephone jack composed of a plurality of jack units which are slidably interconnected to each other. Any desired number of units may be easily assembled together into a unitary telephone jack. Each unit consists of an integral unitary body and a plurality of electrical spring contacts mounted therein.

BACKGROUND OF THE INVENTION

This invention relates to electrical connectors and, more particularly, to those types of connectors commonly know as telephone jacks which are employed in telephone switchboards.

A telephone jack is a socket connector element which is adapted to cooperate with a plug in order to detachably connect a plurality of electrical conductors associated with the plug with the corresponding conductors associated with the jack. In conventional telephone switchboards, a selected number of jacks, normally ten or twenty, are fixedly mounted in close proximity to provide what is generally referred to as a jack strip. Consequently, a jack strip has a fixed number of jack sockets which may be more or less than what is required for most switchboard applications. Thus, what is needed is a telephone jack arrangement in which the exact number of sockets which is desired for the particular switchboard application may be easily and economically provided.

Also, in the conventional jack strip, each jack connector is made up of twelve to fourteen separate components. As a consequence, numerous fabrication and manipulative steps are required to assemble the conventional telephone jack. Thus, it would be advantageous to have a telephone jack which is composed of a fewer number of components than the conventional jack in order to reduce the cost of manufacturing the same.

SUMMARY OF THE INVENTION

The principal object of the present invention is to provide a telephone jack which is composed of a plurality of separate jack units that are readily interconnected to one another so that a desired number of jack sockets may be provided in a single jack assembly.

Another object of the invention is to provide a jack unit which is composed of a unitary integral body and the required number of electrical contacts.

An additional object of the invention is to provide a telephone jack unit which is simple in construction and economical to manufacture.

According to a principal aspect of the present invention, a telephone jack is provided which is composed of a plurality of separate jack units. The units have slide track means which permit adjacent units to be slidably interconnected to each other. Hence, any desired number of units may be readily assembled together into a unitary telephone jack so that there may be provided in a single assembly the exact number of jack sockets required for a particular switchboard application.

According to another aspect of the invention, the frame for the electrical contacts of each jack unit is in the form of a unitary, integral body in which the electrical contacts are mounted. The body is molded from a suitable electrically insulating thermoplastic material, and is so shaped as to be releasably held in predetermined longitudinal registry with an identical slidably engaged adjacent jack body.

Other objects, aspects and advantages of the invention will become apparent from the following description taken in connection with the accompanying drawings.

DESCRIPTION OF THE PREFERRED EMBODIMENTS

Figure 1:
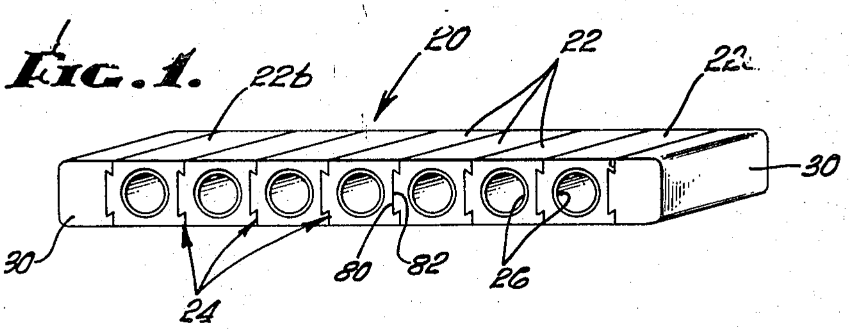
FIG. 1 is a perspective view of a unitary telephone jack assembly made up of a plurality of slidably interconnected jack units showing primarily the socket end of the assembly.

Referring now to the drawings in detail, wherein like reference characters designate like or corresponding parts throughout the various views, there is shown in FIG. 1 a unitary telephone jack assembly, generally designated 20. The assembly includes a plurality of separate jack units 22, which are slidably interconnected by slide track means, indicated at 24, carried by each of the units. The slide track means will be described in detail later. Each jack unit 22 has a socket 26 for receiving a conventional telephone plug, such a plug being illustrated in FIG. 3, and indicated by numeral 28. A pair of blank units 30 are slidably interconnected to the end jack units 22_a_ and 22_b_ to complete the assembly 20. Since the jack units 22 are slidably interconnected to one another, a number of units may be rapidly assembled together into a unitary jack assembly having the exact number of sockets necessary to meet the requirements of any particular switchboard application, and without utilizing separate fastener elements or tools.

Each jack unit 22 consists of a generally rigid, unitary, integral body 32 and preferably three electrical spring contacts 34, 36 and 38. The body 32 is molded into the desired shape from an electrically insulating, durable, thermoplastic material, an example of such material being glass filled polycarbonate. The body is elongated, has a generally rectangular cross-section, and includes a rear end 40, a forward end 42, sides 44 and 46, a top surface 48, and a bottom surface 50. The spring contacts 34, 36 and 38 extend outwardly from the rear end 40 of the body. The socket 26 of the jack unit is in the form of a longitudinally extending bore which opens at the forward end 42 of the body.

Figure 3:
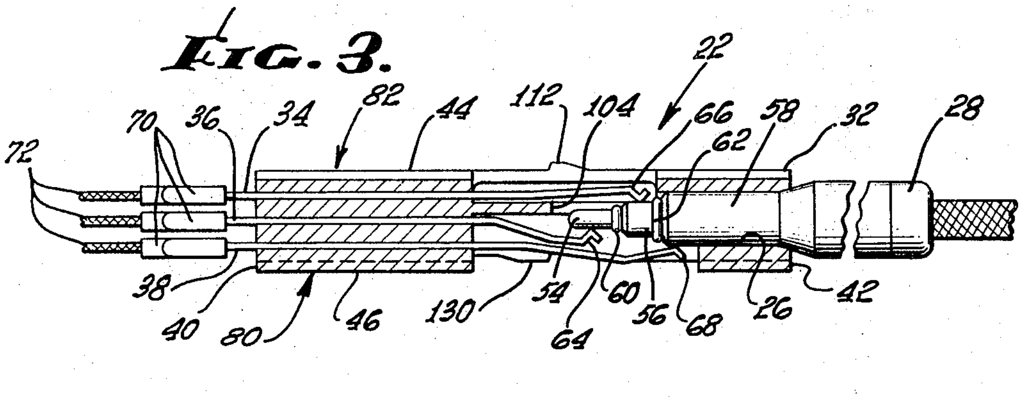
FIG. 3 is a horizontal sectional view through a jack unit showing a telephone plug mounted therein.

As best seen in FIG. 3, the telephone plug 28 used with the jack unit 22 is of conventional construction, having a conductive tip 54 and concentric conductive rings 56 and 58. The tip 54 and ring 56 are separated by an insulator ring 60, while the conductive rings 56 and 58 are separated by an insulating ring 62. With the plug 28 mounted in the socket 26 of the jack unit, as seen in FIG. 3, the tip 54 of the plug contacts the inner end 64 of the contact 36, the conductive ring 56 of the plug contacts the inner end 66 of contact 34, while the conductive ring 58 of the plug contacts the inner end 68 of the contact 38. Preferably, slide-on type plugs 70 connect three conductors 72 to the contacts 34, 36 and 38, the conductors 72 being connected to the electrical circuitry of a telephone switch board, not shown.

Figure 4:
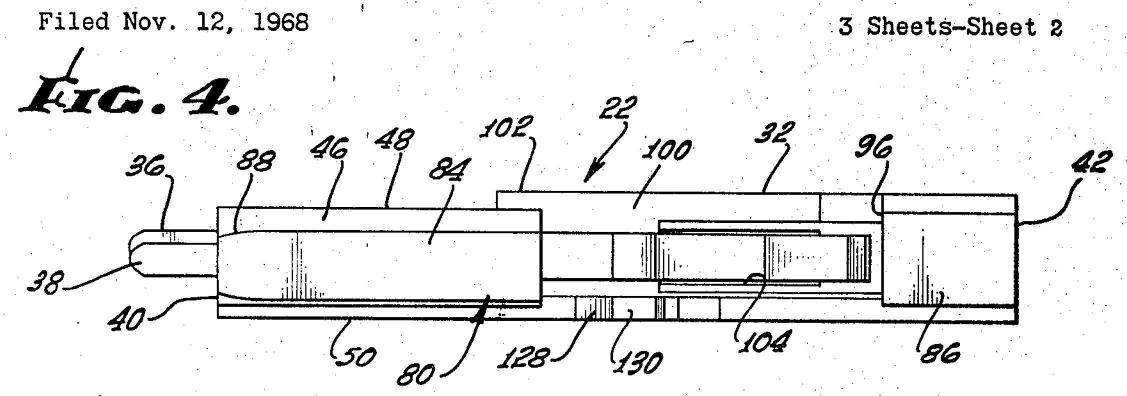
FIG. 4 is an elevational view of one side of the jack unit.
Figure 8:
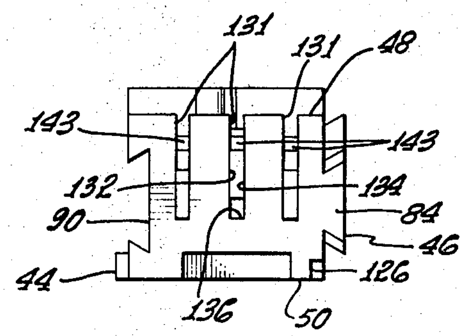
FIG. 8 is an elevational view of the rear end of the jack unit.
Figure 9:
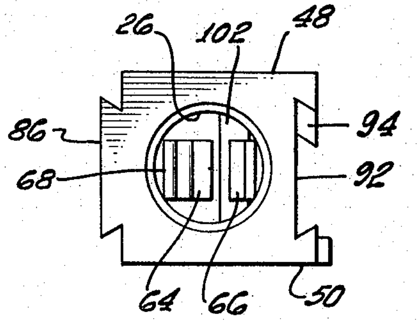
FIG. 9 is an elevational view of the forward end of the jack unit.

The slide track means 24 which permits sliding interconnection of adjacent jack units comprises a key 80 on the side 46 of each jack body 32, and a complementary keyway 82 on the opposite side 44 of the body. Preferably, the key and keyway 80 and 82, respectively, have a dovetail configuration, as seen in FIGS. 1, 8 and 9. As seen in FIG. 4, the key 80 includes a narrow key section 84 adjacent to the rear end 40 of the body 32, and a wider key section 86 adjacent to the forward end of the body. The key section 84 is tapered at its rear end 88 to facilitate engagement of the key with the keyway of an adjacent jack unit.

The keyway 82 includes a narrow keyway section 90 which is complementary to the key section 84 on the opposite side 46 of the body, and a wider keyway section 92 adjacent to the forward end 42 of the body. The keyway section 92 is complementary to the key section 86. At the junction of the keyway sections 90 and 92, on the side 44, there is provided a transverse forwardly facing shoulder 94. A rearwardly facing shoulder 96 is provided on the wider key section 86 on the side 46. The shoulder 96 is spaced a distance from the forward end 42 of the body equal to the distance between the shoulder 94 of the keyway 82 and the forward end 42.

Figure 2:
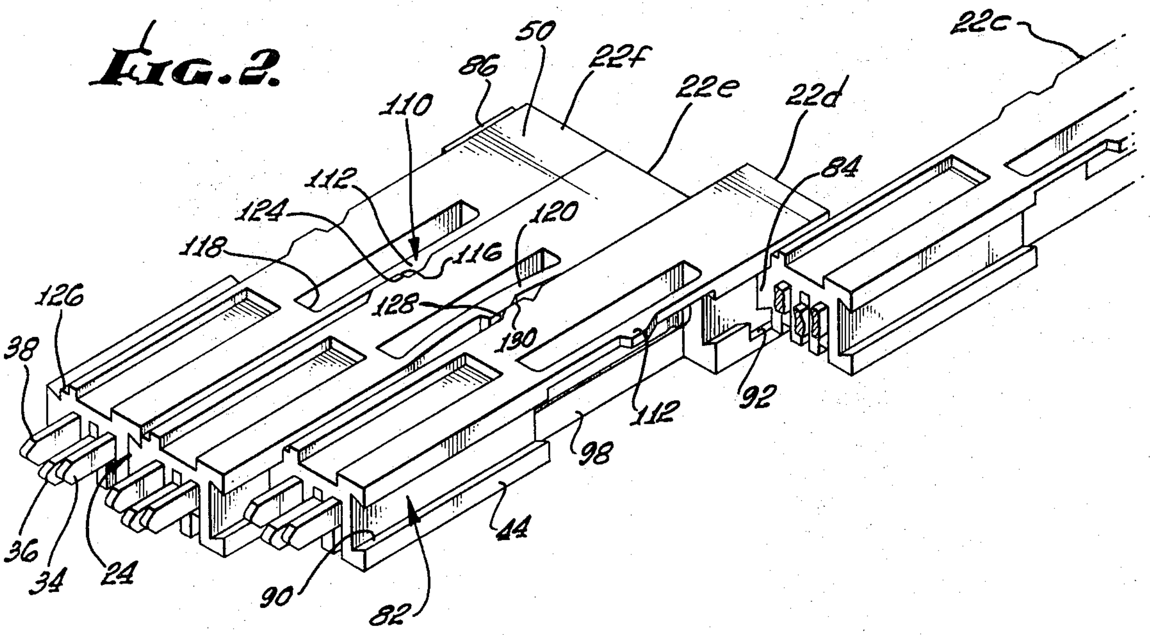
FIG. 2 is a perspective view of four jack units, showing primarily the bottoms and spring contact ends thereof, the first and second units being slidably interconnected with their ends in lateral alignment, the third unit being almost completely engaged with the second unit, and the fourth unit commencing engagement with the third unit.

When it is desired to slidably interconnect two jack units, for example, units **22*c* and 22*d* in FIG. 2, preferably the rearward end of unit 22*c* is positioned with its narrow key section 84 slidably engaging the forward keyway section 92 of the side 44 of the adjacent unit 22*d*. When the unit 22*c* is slid rearwardly with respect to unit 22*d*, the narrow key section 84 of unit 22*c* slidably engages the narrow keyway 90 of the unit 22*d* until the shoulder 96 of the unit 22*c* engages the shoulder 94 of the unit 22*d*. Hence, the shoulders 94 and 96 constitute a stop means for positively limiting rearward movement of one unit with respect to another unit when two units are slidably interconnected. Since the shoulders 94 and 96 of each unit are equidistant from the end 42, they serve to position interconnected units with their forward and rear ends in lateral alignment, as seen by the positioning of units 22*e* and 22*f*** in FIG. 2.

Figure 5:
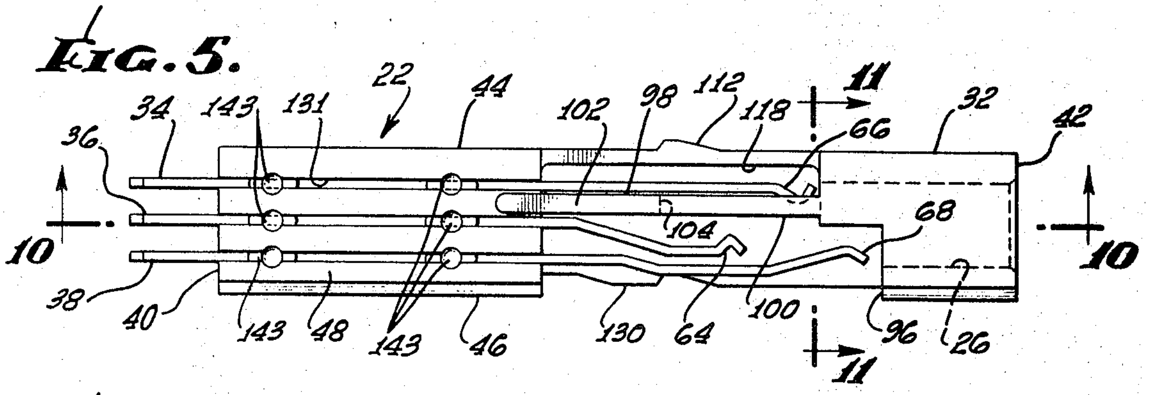
FIG. 5 is a top plan view of the jack unit.
Figure 6:
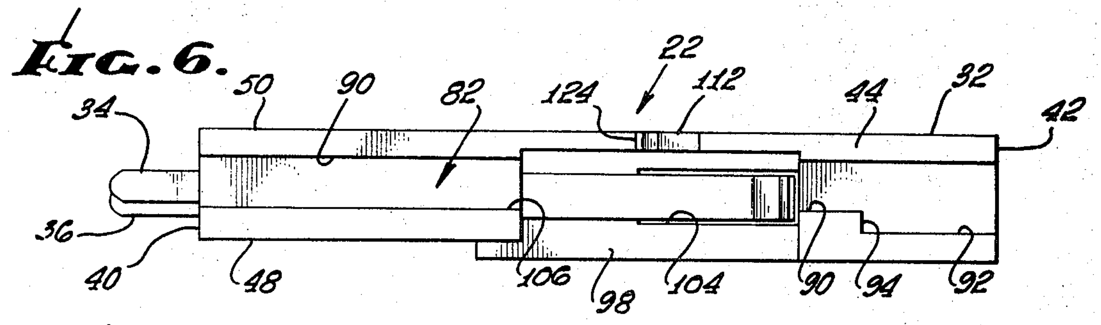
FIG. 6 is an elevational view of the side of the unit opposite to that illustrated in FIG. 4.
Figure 7:
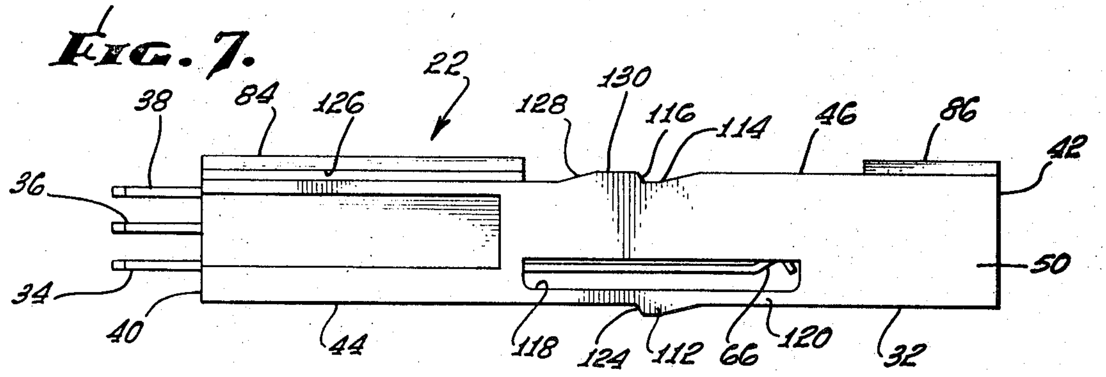
FIG. 7 is a bottom plan view of the jack unit.

Sections of the sides 44 and 46 of each jack unit are cut out as indicated at 98 and 100, best seen in FIG. 5, leaving therebetween a vertical, longitudinally extending wall 102. A transverse slot 104 extends through the wall 102 between cutout sections 98 and 100, so that the conductive ring 56 of the plug 28, when mounted in the socket 26 as seen in FIG. 3, will contact the inner end 66 of the spring contact 34. The cutout section 98 opens both at the wall 44 and the top surface 48 of the body 32, while the cutout section 100 opens at the opposite side 46, and also at the top surface 48. The cutout section 98 interrupts the narrow keyway section 90 on the side 44 of the body, while the cutout section 100 separates the narrow key section 84 from the wider forward key section 86, with the shoulder 96 forming the forward surface of the cutout section 100.

Preferably, the longitudinal length of the cutout section 98 of the jack body is sufficient to permit sliding engagement of adjacent units by commencing engagement of the narrow key section 84 of a first unit directly into the forward entrance 106 of the keyway 90 of a second adjacent unit when the first unit is slightly inclined with its rear end spaced slightly above a plane which is a continuation of the side 44 of the second unit. Hence, one unit may be slidably interconnected to an adjacent unit by commencing sliding engagement of the narrow key section 84 either in the narrow keyway 90, or in the keyway 92 adjacent to the forward end 42 of the adjacent unit, as previously explained.

Latch means, generally designated 110, is provided on each of the units for releasably holding adjacent units assembled together after being slidably interconnected and, hence, also serving to position the units with their respective ends in lateral alignment.

The latch means 110 includes a resiliently mounted latch dog 112 on the side 44 of the body 32 intermediate the forward and read ends thereof, and a notch 114 diametrically positioned on the opposite side 46 of the body. The notch has a forwardly facing inclined shoulder 116. The dog 112 is resiliently mounted by the provision of an elongated vertical slot 118 which passes upwardly through the bottom 50 of the body and opens into the cutout section 98. The slot 118 is sufficiently close to the side 44 of the body so as to provide therebetween a thin resilient strip 120, the dog 112 being an integral portion of such strip. The dog has a rearwardly facing inclined shoulder 124 which will engage the shoulder 116 on the opposite side 46 of an adjacent unit when the two units are slidably interconnected with their ends in lateral alignment, as seen by units **22*e* and 22*f*** in FIG. 2.

Preferably, a portion of the body 32, at the junction of the side 46 and bottom 30, is cut away to provide a longitudinal groove 126. The groove extends from the rear end 40 of the body to an inclined ramp 128 near the shoulder 116 on the side 46, defining therebetween a projection 130. By the provision of the groove 126, there is slight, if any, resistance to sliding movement of one jack unit with respect to another by reason of the dog 112 until the units are almost fully slidably interconnected.

As seen with reference to the units **22*d* and 22*e* in FIG. 2, when the ramp 128 on unit 22*d* engages the dog 112 on unit 22*e*, the resilient strip 120 on unit 22*c* flexes inwardly into the slot 118, permitting the projection 130 to slide past the dog. After the units 22*d* and 22*e* are fully engaged with the shoulder 96 engaging shoulder 94, the shoulder 124 on the unit 22*e* will abut the forwardly facing shoulder 116 of the unit 22*d*, as seen in units 22*e* and 22*f* in FIG. 2. Thus, the latch dog 112 and notch 114 releasably hold the units in predetermined longitudinal registry. The units may be readily disconnected by sliding the unit 22*d*, for example, forwardly with respect to the unit 22*e*, thus causing the strip 120 carrying the dog 112 to be flexed into the slot 118 by the passing projection 130 on the unit 22*e*. After the projection 130 passes the dog 112, the unit 22*d* is free to slide forwardly and hence disengage from the unit 22*e***.

The spring contacts 34, 36 and 38 are mounted in the body 32 by being positioned in longitudinally extending vertical slots 131 which open at the top surface 48 of the rearward portion of each body 32. The slots extend from the rearward end 40 of the body to the cutout sections 98 and 100. The slots 131 have vertical side walls 132 and 134 and bottoms 136. The bottoms 136 of the slots are formed with upwardly extending ridges 138 which engage complementary grooves 140 formed in the lower surface 142 of each of the spring contacts, one of such ridge and groove arrangements being illustrated in FIG. 10. The ridge and groove arrangements between the slots 131 and the spring contacts prevent lengthwise movement of the contacts with respect to the body 32.

Figure 10:
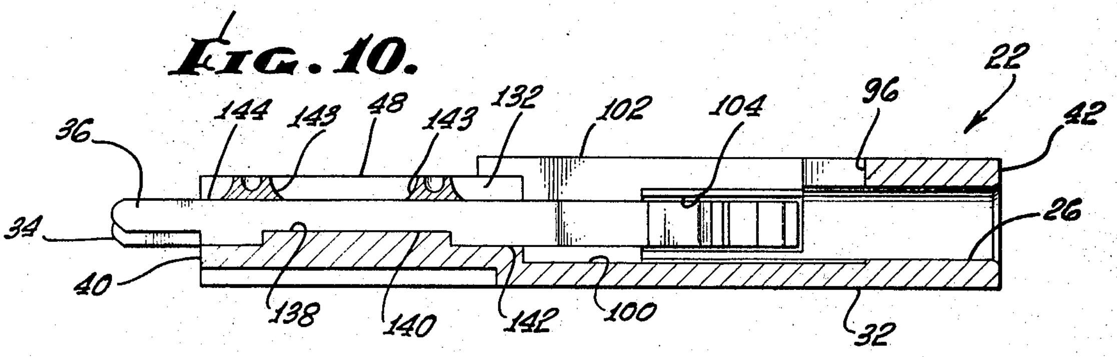
FIG. 10 is a longitudinal vertical section taken along line 10—10 of FIG. 5.

The spring contacts are restricted from vertical movement within the slots 131 by integral webs 143 which overlie the upper edges 144 of the spring contacts, as seen in FIGS. 5, 8 and 10. The webs are formed by utilizing a tool, not shown, preferably having six heated cylindrical vertical rods, each of a diameter greater than the distance between the side walls 132 and 134 of a slot, and arranged to enter the slots at the points where the webs 143 are to be formed. The tool is located with its rods above the slots 131, and is urged downwardly toward the top edge 144 of the contacts so that the material of the plastic body at the slot walls will deform to provide the integral webs 143 overlying the contacts.

From the foregoing it is seen that the present invention provides a jack unit which is extremely simple in construction, employing an integral body or frame 32 in which spring contacts are mounted without the requirement of any separate fastening means or other components not a part of the body material itself. Thus, a telephone jack having a conventional number of spring contacts, namely three, is provided by the present invention within an assembly comprising only four parts, in contrast to conventional telephone spring jacks which employ twelve to fourteen separate components.

Figure 12:
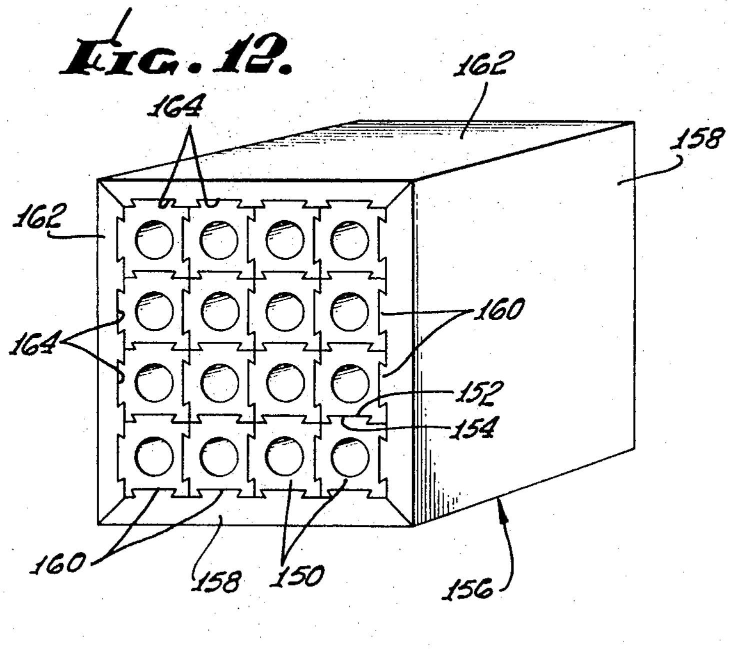
FIG. 12 is a perspective view of a modified form of a telephone jack assembly.
Figure 11:
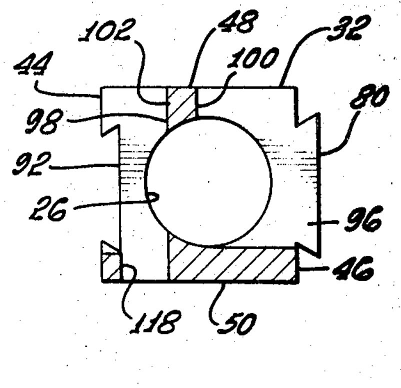
FIG. 11 is a transverse vertical section taken along line 11—11 of FIG. 5.

A modified form of the invention is illustrated in FIG. 12, wherein there is provided a plurality of jack units 150 which are similar to the unit 22, except that they employ keys 152 and keyways 154, corresponding to the keys 80 and keyways 82, on each of the four sides of the units. Thus, the units 150 may be stacked in two dimensions into the form of a block connector, as indicated at 156. Side panels 158 are provided, having longitudinally extending keys 160 which engage the keyways 154 along two sides of the assembled units 150, and side panels 162 are provided having keyways 164 which engage the keys 152 along the remaining sides of the assembled units. The side panels 158 and 160 thus serve to enclose the sides of the units 150, leaving their ends exposed.

Although there is herein shown and described the invention in what is conceived to be the most practical and preferred embodiments, it is recognized that departures may be made therefrom within the scope of the invention, which is not to be limited to the details disclosed herein but is to be accorded the full scope of the claims so as to embrace any and all equivalent structures and devices.

What is claimed is:

1. A telephone jack unit comprising an elongated body of insulating material generally rectangular in cross section, a bore at one end portion of the body for reception of a plug, spring contact members fixedly mounted at the other end portion of the body and with free ends extending toward said bore, a keyway extending longitudinally along one side of said body, a key complementary to the keyway extending longitudinally along the opposite side of the body, a latch dog resiliently mounted on one of said sides and a notch diametrically positioned on the other of said sides, said jack unit being adapted for assembly with an identical jack unit by slidable engagement of the key of one with the keyway of the other, and the jack units to be releasably held in predetermined longitudinal registry by engagement of the latch dog of one jack unit in the notch of the other, the resilient mounting of the latch dog being afforded by an elongated slot in said body, closely adjacent to said one of said sides, providing an elongated resilient strip in said body, and said dog being an integral portion of said strip extending outwardly from said one of said sides.

2. A telephone jack unit comprising an elongated body of insulating material generally rectangular in cross section, a bore at one end portion of the body for reception of a plug, spring contact members fixedly mounted at the other end portion of the body and with free ends extending toward said bore, a keyway extending longitudinally along one side of said body, a key complementary to the keyway extending longitudinally along the opposite side of the body, a latch dog resiliently mounted on one of said sides and a notch diametrically positioned on the other of said sides, said jack unit being adapted for assembly with an identical jack unit by slidable engagement of the key of one with the keyway of the other, and the jack units to be releasably held in predetermined longitudinal registry by engagement of the latch dog of one jack unit in the notch of the other, said body being unitary and integral and having top and bottom surfaces and a plurality of generally vertical slots therein opening in said top surface at said other end portion of the body, each of said slots having side walls and a bottom, said spring contact members being mounted in said slots with the upper surfaces of said contact members lying below said top surface of said body, and the upper portions of said side walls of said slots being deformed to provide integral webs bridging said walls and overlying said upper surfaces of said contact members and thereby preventing vertical movement of said contact members in said slots.

3. A telephone jack unit as set forth in claim 2, wherein there is provided means preventing longitudinal movement of said contact members in said slots.

4. A telephone jack unit as defined in claim 3, wherein said means preventing longitudinal movement of said contact members in said slots comprises stop means disposed in the slots.

References Cited

UNITED STATES PATENTS

| | | | |
|---|---|---|---|
| 3,090,027 | 5/1963 | Phillips et al. | 339—31 |
| 950,107 | 2/1910 | Larsson | 179—96 |
| 3,116,960 | 1/1964 | Olsson et al. | 339—128 |
| 3,289,145 | 11/1966 | Ruehlemann et al. | |

FOREIGN PATENTS

| | | |
|---|---|---|
| 522,835 | 3/1956 | Canada. |
| 810,074 | 3/1959 | Great Britain. |
| 810,430 | 3/1959 | Great Britain. |
| 649,405 | 10/1964 | Belgium. |

ERNEST R. PURSER, Primary Examiner

L. J. STAAB, Assistant Examiner

U.S. Cl. X.R.

339—176, 183, 218